United States Patent [19]

Horimoto

[11] Patent Number: 5,327,481
[45] Date of Patent: Jul. 5, 1994

[54] RADIO COMMUNICATION DEVICE AND CORDLESS ANSWER PHONE

[75] Inventor: Masashi Horimoto, Kyoto, Japan
[73] Assignee: Rohm Co., Ltd., Kyoto, Japan
[21] Appl. No.: 943,304
[22] Filed: Sep. 10, 1992
[30] Foreign Application Priority Data
  Sep. 17, 1991 [JP] Japan .................. 3-236510
[51] Int. Cl.⁵ .................. H04M 11/00; G10L 3/02
[52] U.S. Cl. .......................... 379/58; 379/61
[58] Field of Search ............ 379/56, 58, 59, 61, 379/63, 67, 88; 381/31; 455/68

[56] References Cited

U.S. PATENT DOCUMENTS

| | | | |
|---|---|---|---|
| 4,905,003 | 2/1990 | Helferich | 381/31 |
| 5,081,668 | 1/1992 | Ito | 379/58 |
| 5,220,594 | 6/1993 | Ohnishi et al. | 379/61 |

FOREIGN PATENT DOCUMENTS 2166323 4/1986 United Kingdom .................. 381/31

OTHER PUBLICATIONS

Rappaport and Vranesic, "A Multiprocessor Based Digital Speech Compressor", Canadian Elec. Eng. Journal, 1981.

Primary Examiner—Curtis Kuntz
Assistant Examiner—William Cumming
Attorney, Agent, or Firm—Koda and Androlia

[57] ABSTRACT

A radio communication device and a cordless answer phone including base and hand sets connected with each other by radio and having a message recording and reproducing device is capable of improving sound quality of messages recorded and reproduced. A pair of switches are connected between a radio transmission and receiving device and a compandor having a compressor and an expander for the radio communication between the base and hand sets, and the sound quality improvement function of the compandor is used in recording and reproducing an answer message and a telephone message. When the message is recorded in the message recording and reproducing device, the amplitude of the sound signals is compressed, and after the compressed message is reproduced from the message recording and reproducing device, the amplitude of the sound signals of the message is expanded to enable the improvement of the sound quality.

3 Claims, 2 Drawing Sheets

RADIO COMMUNICATION DEVICE AND CORDLESS ANSWER PHONE

BACKGROUND OF THE INVENTION i) Field of the Invention

The present invention relates to a radio communication device, and more particularly to a cordless answer phone having a voice or message recording and reproducing device, which is capable of performing radio communication between base and hand sets.

ii) Description of the Related Arts

Recently, multifunctioning and multiforming are carried out to a remarkable extent in a telephone for general home use. In particular, in a party line telephone composed of a base set and a plurality of hand sets, a cordless telephone capable of performing a conversation between the base and hand sets by radio is becoming mainstream. In such a cordless party line telephone, since the conversation between the base and hand sets is performed by the radio, in order to reduce noise, cross talk and induced noise, usually, a so-called compandor circuit is provided for preventing sound quality deterioration in the communication by compressing or expanding the amplitude of a voice signal.

Further, in addition to this function, a telephone provided with a so-called automatic answering device has been widely used. In this answer phone, by using an automatic message recording and reproducing device comprised of a sound memory, a cassette tape recorder and the like, a previously recorded answer message of a telephone subscriber can be automatically played in response to a telephone call input from an external line or a telephone message input from the external line can be automatically recorded.

FIGS. 2A and 2B show a conventional cordless answer phone. First, as shown in FIG. 2A, a base set 10 is provided with a speech network part 11 having a receiving part Rx and a transmitting part Tx so as to perform control of transmission and reception between the base set 10 and a telephone subscriber line. The base set 10 also includes a compandor 12 having a compressor (COMP) 13 and an expander (EXP) 14, a radio transmission and receiving device 18 having a transmitting part Tx and a receiving part Rx, and a message recording and reproducing device 17 having a recorder REC and a player PLAY. The receiving part Rx of the speech network part 11 is connected to the transmitting part Tx of the radio transmission and receiving device 18 via the compressor 13 of the compandor 12, and the transmitting part Tx of the speech network part 11 is connected to the receiving part Rx of the radio transmission and receiving device 18 via the expander 14 of the compandor 12. The radio transmission and receiving device 18 is linked to an antenna 19 so as to carry out the transmission and reception of a radio signal between the base set 10 and a hand set 30 via the antenna 19.

Between the speech network part 11 and the compandor 12, a pair of switches 15 and 16 are connected in parallel. In each switch 15 or 16, contact points a and b are connected to the receiving part Rx side and the transmitting part Tx side of the speech network part 11, respectively. Also, a common contact point c of the switch 15 is coupled with a REC terminal of the message recording and reproducing device 17 and a microphone 24 through an amplifier 23, and a common contact point c of the switch 16 is connected to a PLAY terminal of the message recording and reproducing device 17 and a speaker 22 through an amplifier 21.

Further, as shown in FIG. 2B, the hand set 30 includes a compandor 33 having a compressor (COMP) 41 and an expander (EXP) 34 and a radio transmission and receiving device 31 having a transmitting part Tx and a receiving part Rx for performing the transmission and reception of the radio signal between the hand set 30 and the base set 10 via an antenna 32. The receiving part Rx of the radio transmission and receiving device 31 is connected to a speaker 36 via the expander 34 of the compandor 33 and an amplifier 35, and the transmitting part Tx of the radio transmission and receiving device 31 is linked with a microphone 38 via the compressor 41 of the compandor 33 and an amplifier 39.

Next, the operation of the conventional cordless answer phone described above will now be described. In this case, a usual conversation operation is carried out in the same manner as is well-known and thus the description can be omitted for brevity.

(1) Recording of an answer message of a telephone subscriber:

By inputting an answer message of the telephone subscriber, to be output in response to the call input from the external line during his absence, to the microphone 24 of the base set 10, the answer message is input to the recorder REC of the message recording and reproducing device 17 and is recorded on a magnetic tape (not shown) therein.

Also, the answer message can be recorded from the microphone 38 of the hand set 30. In this case, the answer message input from the microphone 38 is fed to the compressor 41 of the compandor 33 through the amplifier 39, and the amplitude of the voice is compressed in the compressor 41. Then, the compressed answer message is sent out from the antenna 32 via the transmitting part Tx of the radio transmission and receiving device 31. In the base set 10, the compressed answer message is received by the receiving part Rx of the radio transmission and receiving device 18 via the antenna 19, and the received answer message is input to the expander 14 of the compandor 12. At this time, the switch 15 is turned to the contact point b side. Hence, the amplitude of the voice of the compressed answer message is expanded to restore to the original voice waveform in the expander 14, and the restored answer message is input from the compressor 41 to the recorder REC of the message recording and reproducing device 17 and is recorded on the magnetic tape therein.

(2) Playing of the recorded answer message:

When a telephone call is input from the external line, by performing a predetermined call receiving process, the receiving part Rx of the speech network part 11 connects the line in the base set 10. At this time, when an automatic answer mode is selected, the answer message recorded on the magnetic tape of the message recording and reproducing device 17 is automatically played and is output from the player PLAY of the message recording and reproducing device 17. In this case, the switch 16 is turned to the contact point b side. Hence, the played answer message is sent out on the telephone subscriber line via the transmitting part Tx of the speech network part 11.

(3) Recording of a telephone message input from an external line:

When a telephone message is sent from the external line in response to the answer message, the telephone message is received by the receiving part Rx of the speech network part 11. At this time, the switch 15 is turned to the contact point a side, and thus the received telephone message is input to the recorder REC of the message recording and reproducing device 17 and is automatically recorded on the magnetic tape therein.

(4) Replaying of the recorded telephone message:

After returning home, the telephone subscriber replays the recorded telephone message by a predetermined operation in the base set 10, and the replayed telephone message is output from the player PLAY of the message recording and reproducing device 17. The telephone message is fed to the speaker 22 via the amplifier 21 and is output from the speaker 22.

Also, the telephone message can be heard from the hand set 30. In this case, when the telephone subscriber carries out a predetermined operation from the hand set 30, the switch 16 is turned to the contact point a side, and the replayed telephone message is output from the player PLAY of the message recording and reproducing device 17 and is input to the compressor 13 of the compandor 12. The amplitude of the voice of the replayed telephone message is compressed in the compressor 13, and the compressed telephone message is sent out from the antenna 19 via the transmitting part Tx of the radio transmission and receiving device 18. In the hand set 30, the compressed telephone message is received by the receiving part Rx of the radio transmission and receiving device 31 via the antenna 32, and the received telephone message is input to the expander 34 of the compandor 33. The amplitude of the voice of the received telephone message is expanded to restore to the original voice waveform in the expander 34, and the restored telephone message is sent from the expander 34 to the speaker 36 via the amplifier 35 to output the telephone message from the speaker 36.

Further, the recorded telephone message can be replayed by the telephone subscriber on an external telephone so as to listen to the recorded telephone message. In this case, when the telephone subscriber performs a predetermined operation from the external telephone, the switch 16 is turned to the contact point b side, and the replayed telephone message is output from the player PLAY of the message recording and reproducing device 17 and is sent out on the telephone subscriber line via the transmitting part Tx of the speech network part 11. Hence, the telephone subscriber can hear the telephone message recorded during his absence from the external telephone.

As described above, in the conventional cordless answer phone, since the switches for turning over the signal paths are arranged between the speech network part and the compandor, the recording and the reproducing of the answer message and the telephone message can be performed in the form of the original sound waveform. Thus, although the compandor for improving the sound quality of the radio signals is provided in both the base set and the hand set, the compandor can not be effectively used in the recording and the reproducing, and the quality of the sound recorded or reproduced can not be improved.

SUMMARY OF THE INVENTION

It is therefore an object of the present invention to provide a radio communication device and a cordless answer phone in view of the problems of the prior art, which are capable of improving the sound quality of messages to be recorded and reproduced.

In accordance with one aspect of the present invention, there is provided a radio communication device for communicating from a first party to a second party. comprising: means for recording and reproducing a message either input from or output to the second party; means for compressing an amplitude of a sound signal of the message either to be transmitted to the second party by radio or to be recorded to the recording and reproducing means to obtain a compressed message; and means for expanding the amplitude of the sound signal of the compressed message either transmitted from the second party or reproduced by the recording and reproducing means. In this case, noise components can be removed at the time of message recording and reproducing.

In accordance with another aspect of the present invention, there is provided a cordless answer phone for performing a conversation between base and hand sets by a radio signal, comprising: recording and reproducing means having a record terminal and a play terminal for recording and reproducing an answer message of a telephone subscriber and a telephone message input from a telephone subscriber line; means for compressing an amplitude of a sound signal of the answer message and the telephone message; means for expanding the amplitude of the sound signal of the answer message and the telephone message; radio transmitting and receiving means having a transmitting part and a receiving part for performing a radio connection between the base and hand sets; first switch means for selectively connecting the record terminal of the recording and reproducing means with either the compressing means or the transmitting part of the radio transmitting and receiving means; and second switch means for selectively connecting the play terminal of the recording and reproducing means with either the expanding means or the receiving part of the radio transmitting and receiving means. In this case, the noise components can be removed by compressing and expanding the amplitude of the sound signal of the message.

In the radio communication device and the cordless answer phone according to the present invention, when recording, the amplitude of the sound signal of the message is compressed to record the compressed message, and when reproducing, the amplitude of the sound signal of the compressed message is expanded to restore to the original sound waveform to output the restored message.

As described above, according to the present invention, since a compandor having a compressor and an expander, to be used for improving sound quality of a radio signal between radio communication devices having base and hand sets is also used in the recording and reproducing of a variety of messages, the noise components can be removed by the compression and the expansion processes of the sound signal amplitude. Hence, the sound quality of the messages recorded and reproduced can also be improved.

BRIEF DESCRIPTION OF THE DRAWINGS

The objects, features and advantages of the present invention will become more apbase from the consideration of the following detailed description, taken in conjunction with the accompanying drawings, in which.

DESCRIPTION OF THE PREFERRED EMBODIMENTS

The present invention will now be described in detail in connection with its preferred embodiments with reference to the accompanying drawings. Now, according to the present invention, a cordless answer phone for general home use exemplified as one example of a radio communication device will be described.

Figure 1A:
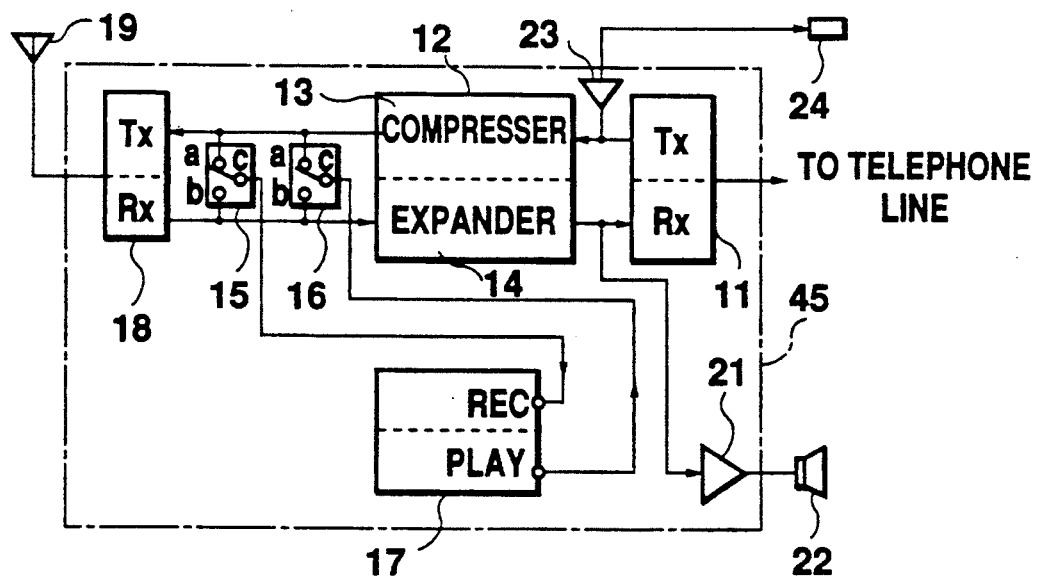
FIGS. 1A, 1B and 1C are block diagrams of a cordless answer phone according to the present invention.
Figure 1B:
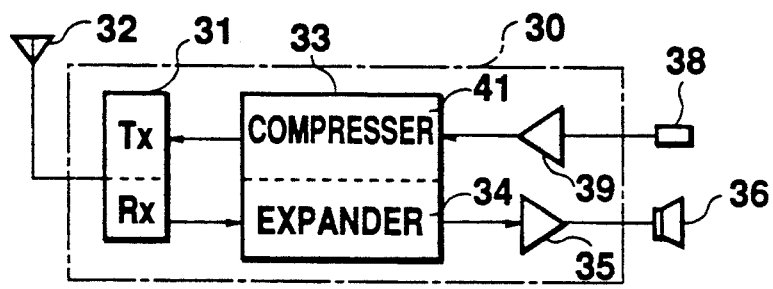
Figure 2A:
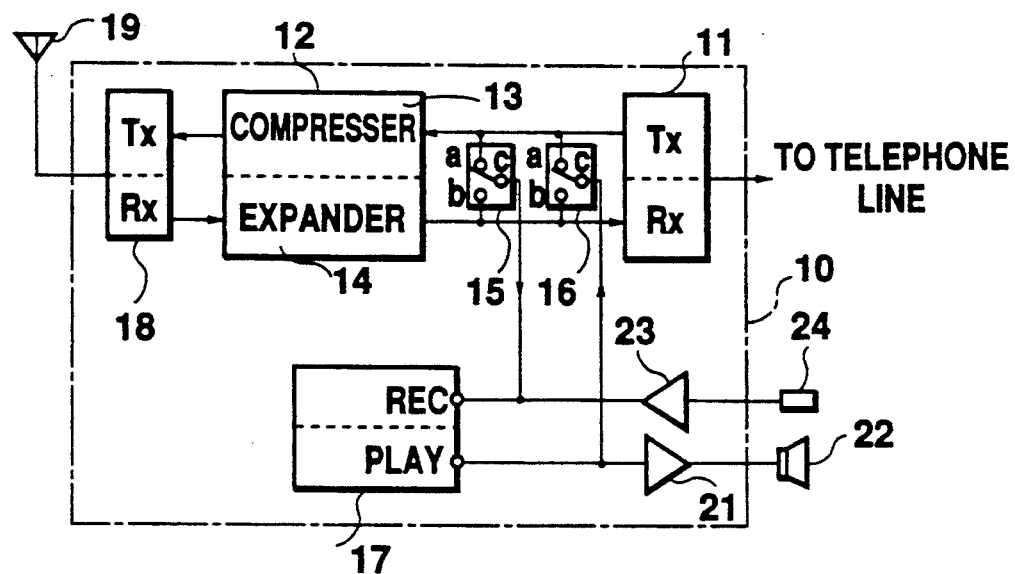
FIGS. 2A and 2B are block diagrams of a conventional cordless answer phone.

FIGS. 1A and 1B show one embodiment of a cordless answer phone according to the present invention, wherein the same parts as those of the conventional cordless answer phone described above in connection with FIGS. 2A and 2B are designated by the same reference characters and thus the repeated description thereof can be omitted for brevity.

Figure 2B:
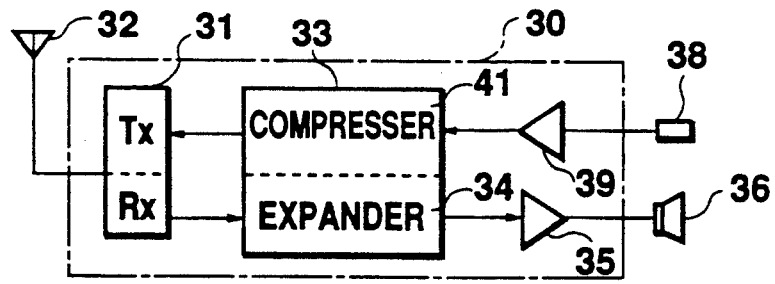

FIG. 1A shows a base set 45 and FIG. 1B shows a hand set 30 having the same construction as the conventional hand set shown in FIG. 2B. As shown in FIG. 1A, the base set 45 is provided with a speech network part 11 having a receiving part Rx and a transmitting part Tx so as to perform control of transmission and reception between the base set 45 and a tele-phone line. The base set 45 also includes a compandor 12 having a compressor (COMP) 13 and an expander (EXP) 14, a radio transmission and receiving device 18 having a transmitting part Tx and a receiving part Rx, and a message recording and reproducing device 17 having a recorder REC and a player PLAY. The receiving part Rx of the speech network part 11 is connected to the transmitting part Tx of the radio transmission and receiving device 18 via the compressor 13 of the compandor 12, and the transmitting part Tx of the speech network part 11 is connected to the receiving part Rx of the radio transmission and receiving device 18 via the expander 14 of the compandor 12. The radio transmission and receiving device 18 is linked to an antenna 19 so as to carry out the transmission and reception of a radio signal between the base set 45 and the hand set 30 via the antenna 19.

In this embodiment, between the radio transmission and receiving device 18 and the compandor 12, a pair of switches 55 and 56 for switching signal paths are connected in parallel. In each switch 15 and 16, contact points a and b are connected to the output side of the compressor 13 and the input side of the expander 14 of the compandor 12, respectively. Also, a common contact point c of the switch 55 is coupled with a REC terminal of the message recording and reproducing device 17, and a common contact point c of the switch 56 is connected to a PLAY terminal of the message recording and reproducing device 17. A microphone 24 is connected to the input side of the compressor 13 of the compandor 12 and the receiving part Rx of the speech network part 11 via an amplifier 23, and a speaker 22 is connected to the output side of the expander 14 of the compandor 12 and the transmitting part Tx of the speech network part 11 via an amplifier 21.

Next, the operation of the above-described cordless answer phone will now be described. In this case, a normal conversation operation is carried out in the same manner as is well-known and thus can be omitted for brevity.

(1) Recording of an answer message of a telephone subscriber:

By inputting an answer message of the telephone subscriber, to be output in response to the call input from the external line during his absence, to the microphone 24 of the base set 45, the answer message is input to the compressor 13 of the compandor 12. At this time, the switch 15 is turned to the contact point a side. Hence, the amplitude of the sound signals of the answer message arecompressed in the compressor 13 and the compressed answer message is sent to the recorder REC of the message recording and reproducing device 17 via the switch 15 and is recorded on a magnetic tape (not shown) therein.

Also, the answer message can be recorded from the microphone 38 of the hand set 30. In this case, the answer message input from the microphone 38 is fed to the compressor 41 of the compandor 33 through the amplifier 39, and the amplitude of the voice is compressed in the compressor 41. Then, the compressed answer message is sent out from the antenna 32 via the transmitting part Tx of the radio transmission and receiving device 31. In the base set 45, the compressed answer message is received by the receiving part Rx of the radio transmission and receiving device 18 via the antenna 19. At this time, the switch 15 is turned to the contact point b side. Hence, the compressed answer message received in the receiving part Rx of the radio transmission and receiving device 18 is input to the recorder REC of the message recording and reproducing device 17 and is recorded on the magnetic tape therein.

(2) Playing of the recorded answer message:

When a telephone call is input from the external line, by performing a predetermined call receiving process, the receiving part Rx of the speech network part 11 connects the line in the base set 45. At this time, when an automatic answer mode is selected, the compressed answer message recorded on the magnetic tape of the message recording and reproducing device 17 is automatically reproduced and is output from the player PLAY of the message recording and reproducing device 17. In this case, the switch 16 is turned to the contact point b side. Hence, the compressed answer message is input to the expander 14 of the compandor 12 via the switch 16, and the amplitude of the sound of the compressed answer message is expanded in the expander 14 to restore to the original sound waveform. Then, the restored answer message is sent out on the telephone subscriber line via the transmitting part Tx of the speech network part 11. Hence, a calling person on an external telephone can listen to the answer message.

(3) Recording of a telephone message input from an external line:

When a telephone message is sent from the external line in response to the answer message, the telephone message is received by the receiving part Rx of the speech network part 11 and is then input to the compressor 13 of the compandor 12, and the amplitude of the sound signals of the received telephone message is compressed in the compressor 13. At this time, the switch 15 is turned to the contact point a side. Thus, the compressed telephone message is input to the recorder REC of the message recording and reproducing device 17 via the switch 15 and is automatically recorded on the magnetic tape therein.

(4) Replaying of the recorded telephone message:

After returning home, the telephone subscriber replays the recorded telephone message by a predetermined operation in the base set 45, and the compressed telephone message is output from the player PLAY of the message recording and reproducing device 17. At this time, the switch 16 is turned to the contact point b side. Hence, the compressed telephone message is input to the expander 14 of the compandor 12 via the switch 16 and the amplitude of the sound signals of the compressed telephone message are expanded in the expander 14 to restore to the original sound waveform. The restored telephone message is fed to the speaker 22 via the amplifier 21 and is output from the speaker.

Also, the telephone message can be heard from the hand set 30. In this case, when the telephone subscriber carries out a predetermined operation from the hand set 30, the switch 16 is turned to the contact point a side. The compressed telephone message output from the player PLAY of the message recording and reproducing device 17 is sent out from the antenna 19 via the transmitting part Tx of the radio transmission and receiving device 18. In the hand set 30, the compressed telephone message is received by the receiving part Rx of the radio transmission and receiving device 31 via the antenna 32, and the received telephone message is input to the expander 34 of the compandor 33. The amplitude of the voice of the received telephone message is expanded to restore to the original voice waveform in the expander 34, and the restored telephone message is fed from the expander 34 to the speaker 36 via the amplifier 35 to output the telephone message from the speaker 36.

Further, the recorded telephone message can be replayed by the telephone subscriber on the external telephone so as to listen to the recorded telephone message. In this case, when the telephone subscriber performs a predetermined operation from the external telephone, the switch 16 is turned to the contact point b side. Hence, the compressed telephone message replayed in the player PLAY of the message recording and reproducing device 17 is input to the expander 14 of the compandor 12 via the switch 16 and the amplitude of the sound signals of the compressed telephone message are expanded in the expander 14 to restore to the original sound waveform. The restored telephone message is sent out on the telephone subscriber line via the transmitting part Tx of the speech network part 11. Hence, the telephone subscriber can listen to the telephone message recorded during his absence from the external telephone.

As described above, in the embodiment, the amplitude of the messages is first compressed and then the compressed messages are recorded in the message recording and reproducing device 17. In the reproducing of the messages, the amplitude of the compressed messages is expanded to restore to the original sound waveform, and the restored messages are output.

Although the message recording and reproducing device is provided in the base set of the cordless answer phone in the above-described embodiment, the message recording and reproducing device can be also formed in the hand set.

Figure 1C:
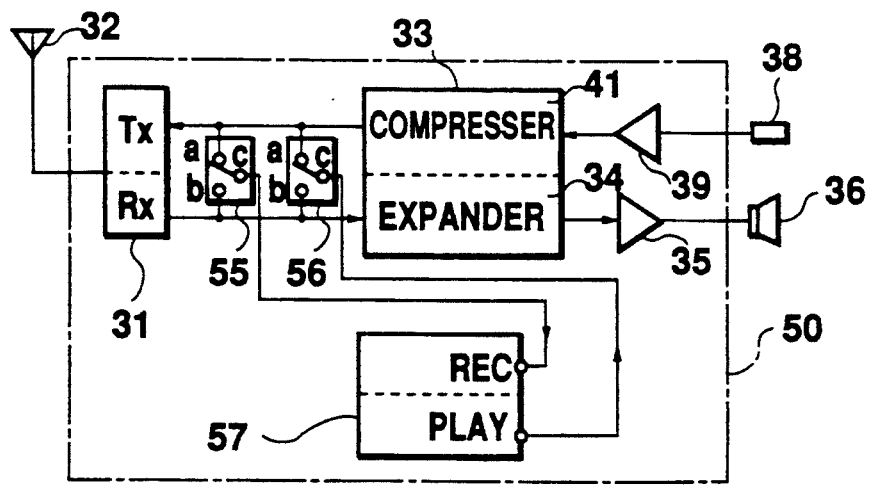

FIG. 1C shows another hand set 50 of a cordless answer phone according to the present invention. In this case, a pair of switches 55 and 56 having the same construction as the switches 15 and 16 are connected in parallel between the compandor 33 and the radio transmission and receiving device 31 and a message recording and reproducing device 57 having the same construction as the message recording and reproducing device 17 is provided. In each switch 55 or 56, contact points a and b are connected to the output side of the compressor 41 and the input side of the expander 34 of the compandor 33, respectively. Also, a common contact point c of the switch 55 is coupled with a REC terminal of the message recording and reproducing device 57, and a common contact point c of the switch 56 is connected to a PLAY terminal of the message recording and reproducing device 57.

In the hand set 50, the signal paths are selected by the switches 55 and 56 so as to perform the recording and reproducing depending on the cases. When the answer message is recorded in the hand set 50, the switch 55 is turned to the contact point a side. The answer message is input from the microphone 38 to recorder REC of the message recording and reproducing device 57 via the amplifier 39 and the compressor 41 and the compressed answer message is recorded in the message recording and reproducing device 57 in the same manner as described above. Also, when the compressed answer message or the compressed telephone message from or via the base set 45 is recorded in the message recording and reproducing device 57, the switch 55 is turned to the contact point b side. The compressed message is input from the base set 45 to the recorder REC of the message recording and reproducing device 57 via the receiving part Rx of the radio transmission and receiving device 31 and the compressed message is recorded in the message recording and reproducing device 57 in the same manner as described above.

Further, when the message recorded in the message recording and reproducing device 57 is reproduced in the hand set 50, the switch 56 is turned to the contact point b side, and the compressed message replayed by the message recording and reproducing device 57 is fed to the speaker 36 via the expander 34 of the compandor 33 and the amplifier 35 to output the message from the speaker 36 in the same manner as described above. Also, when the message recorded in the message recording and reproducing device 57 is reproduced in the base set 45, the switch 56 is turned to the contact point a side, and the compressed message replayed by the message recording and reproducing device 57 is sent from the antenna 32 to the base set 45 via the transmitting part Tx of the radio transmission and receiving device 31 by the radio in the same manner as described above. Then, the base set 45 receives the compressed message by the receiving part Rx of the radio transmission and receiving device 18 via the antenna 19, and the received compressed message is processed in the base set 45 in the same manner as described above.

In the above-described embodiments, although the present invention has been described in connection with the cordless answer phone, the present invention is not restricted to the aforementioned embodiments, and it is readily understood that the present invention can be also applied to any usual radio communication device including a compandor having a compressor and an expander and a message recording and reproducing device.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A cordless answer phone for performing a conversation between a base set and at least one hand set by a radio signal, comprising:

recording and reproducing means having a record terminal and a play terminal for recording and reproducing an answer message of a telephone subscriber and a telephone message input from a telephone subscriber line;

means for compressing an amplitude of a sound signal of the answer message and the telephone message;

means for expanding the amplitude of the sound signal of the answer message and the telephone message;

radio transmitting and receiving means having a transmitting part and a receiving part for performing a radio connection between the base set and the at least one hand set;

first switch means for selectively connecting the record terminal of the recording and reproducing means with either the compressing means or the transmitting part of the radio transmitting and receiving means; and second switch means for selectively connecting the play terminal of the recording and reproducing means with either the expanding means or the receiving part of the radio transmitting and receiving means.

2. The cordless answer phone of claim 1, wherein the base set includes the recording and reproducing means, the compressing means, the expanding means, the radio transmitting and receiving means, the first switch means and the second switch means, wherein the first switch means connects the compressing means with the record terminal of the recording and reproducing means when the messages from the telephone subscriber line and the base set are recorded, and connects the receiving part of the radio transmitting and receiving means with the record terminal of the recording and reproducing means when the messages from the hand set is recorded, and wherein the second switch means connects the expanding means with the play terminal of the recording and reproducing means when the message is sent out on the telephone subscriber line and the message is reproduced by the base set, and connects the transmitting part of the radio transmitting and receiving means with the record terminal of the recording and reproducing means when the message is reproduced by the hand set.

3. The cordless answer phone of claim 1, wherein the hand set includes the recording and reproducing means, the compressing means, the expanding means, the radio transmitting and receiving means, the first switch means and the second switch means, wherein the first switch means connects the receiving part of the radio transmitting and receiving means with the record terminal of the recording and reproducing means when the messages from the base set and the telephone subscriber line via the base set are recorded, and connects the compressing means and receiving means with the record terminal of the recording and reproducing means when the message from the hand set is recorded, and wherein the second switch means connects the transmitting part of the radio transmitting and receiving means with the play terminal of the recording and reproducing means when the message is sent out on the telephone subscriber line and the message is reproduced by the base set, and connects the expanding means with the record terminal of the recording and reproducing means when the message is reproduced by the hand set.

* * * * *